United States Patent
Braitberg et al.

(10) Patent No.: US 7,191,153 B1
(45) Date of Patent: Mar. 13, 2007

(54) CONTENT DISTRIBUTION METHOD AND APPARATUS

(75) Inventors: Michael F. Braitberg, Boulder, CO (US); Steven B. Volk, Boulder, CO (US)

(73) Assignee: DPHI Acquisitions, Inc., Boulder, CO (US)

( * ) Notice: Subject to any disclaimer, the term of this patent is extended or adjusted under 35 U.S.C. 154(b) by 0 days.

(21) Appl. No.: 09/393,899

(22) Filed: Sep. 10, 1999

(51) Int. Cl.
*G06F 17/60* (2006.01)

(52) U.S. Cl. .......................... 705/51; 705/50; 705/52; 705/54; 705/57; 705/56

(58) Field of Classification Search ................ 705/57, 705/52, 1, 14, 59; 713/200; 709/203, 218, 709/202, 229; 380/11; 725/121; 710/7; 364/900; 717/1; 428/141; 707/508.1, 104.1, 707/513; 235/375, 462.01, 472.01; 370/352
See application file for complete search history.

(56) References Cited

U.S. PATENT DOCUMENTS

| | | | |
|---|---|---|---|
| 3,530,441 A | 9/1970 | Ovshinsky | 340/175 |
| 3,868,651 A | 2/1975 | Ovshinsky | 340/173 |
| 3,983,542 A | 9/1976 | Ovshinsky | 340/173 |
| 4,205,387 A | 5/1980 | Ovshinsky et al. | 364/900 |
| 4,542,495 A | 9/1985 | Ziegler et al. | 369/273 |
| 4,571,718 A | 2/1986 | Cahill et al. | 369/291 |
| 4,577,289 A | 3/1986 | Comerford et al. | 364/900 |
| 4,647,944 A | 3/1987 | Gravesteijn et al. | 346/1.1 |
| 4,677,604 A * | 6/1987 | Selby, III et al. | 369/33 |
| 4,710,899 A | 12/1987 | Young et al. | 365/113 |
| 4,872,156 A | 10/1989 | Steenbergen et al. | 369/275 |
| 4,945,530 A | 7/1990 | Sandell et al. | 369/291 |
| 4,953,209 A | 8/1990 | Ryder, Sr. et al. | 380/23 |
| 4,960,680 A | 10/1990 | Pan et al. | 430/346 |
| 5,014,234 A | 5/1991 | Edwards, Jr. | 364/900 |
| 5,060,106 A | 10/1991 | Davis et al. | 360/133 |
| 5,063,558 A | 11/1991 | Takahashi | 369/291 |
| 5,073,889 A | 12/1991 | Rayner | 369/291 |
| 5,077,726 A | 12/1991 | Dodds et al. | 369/291 |
| 5,103,476 A | 4/1992 | Waite et al. | 380/4 |
| 5,128,099 A | 7/1992 | Strand et al. | 420/579 |
| 5,146,552 A | 9/1992 | Cassorla et al. | 395/145 |
| 5,172,413 A | 12/1992 | Bradley et al. | 380/20 |
| 5,247,575 A | 9/1993 | Sprague et al. | 380/9 |
| 5,271,978 A | 12/1993 | Vazan et al. | 428/64 |
| 5,272,693 A | 12/1993 | Fujisawa | 369/291 |

(Continued)

FOREIGN PATENT DOCUMENTS

EP    1 073 222    1/2001

(Continued)

*Primary Examiner*—Vincent A. Millin
*Assistant Examiner*—Debra Charles
(74) *Attorney, Agent, or Firm*—Johnathan W. Hallman; MacPherson Kwok Chen & Heid LLP

(57) ABSTRACT

Media which stores protected content is distributed to users without the need for payment at the time of media distribution. Payment can be performed at a later time in response to which content may be enabled, and/or users may selectively pay for, and receive enablement of, content such that only portions of content on given media may be accessible at a given time. Following the first enablement of content, access rights may be expanded or otherwise changed, e.g., in response to a second payment.

8 Claims, 5 Drawing Sheets

U.S. PATENT DOCUMENTS

| | | | |
|---|---|---|---|
| 5,280,467 A | 1/1994 | Wanger et al. | 369/275.5 |
| 5,291,554 A | 3/1994 | Morales | 380/5 |
| 5,323,380 A | 6/1994 | Oda et al. | 369/275.1 |
| 5,331,627 A | 7/1994 | Childers et al. | 369/291 |
| 5,339,091 A | 8/1994 | Yamazaki et al. | 345/104 |
| 5,379,266 A | 1/1995 | Russell | 365/234 |
| 5,436,871 A | 7/1995 | Russell | 365/234 |
| 5,436,875 A * | 7/1995 | Shinada | 369/30.23 |
| 5,447,768 A | 9/1995 | Takahashi | 428/66.6 |
| 5,465,238 A | 11/1995 | Russell | 365/234 |
| 5,475,399 A | 12/1995 | Borsuk | 345/130 |
| 5,509,070 A | 4/1996 | Schull | 380/4 |
| 5,511,035 A | 4/1996 | Russell | 365/234 |
| 5,511,058 A | 4/1996 | Visel et al. | 369/103 |
| 5,532,920 A | 7/1996 | Hartrick et al. | 364/419.1 |
| 5,534,385 A | 7/1996 | Spahn | 430/270.13 |
| 5,541,888 A | 7/1996 | Russell | 365/234 |
| 5,555,304 A | 9/1996 | Hasebe et al. | 380/4 |
| 5,563,947 A | 10/1996 | Kikinis | 380/4 |
| 5,581,540 A | 12/1996 | Dang | 369/291 |
| 5,587,994 A | 12/1996 | Nagaura et al. | 369/291 |
| 5,591,501 A | 1/1997 | Ovshinsky et al. | 428/64.1 |
| 5,610,902 A | 3/1997 | Childers et al. | 369/289 |
| 5,619,488 A | 4/1997 | Ota et al. | 369/112 |
| 5,629,980 A | 5/1997 | Stefik et al. | 380/4 |
| 5,638,241 A | 6/1997 | Sonderegger | 360/133 |
| 5,646,992 A * | 7/1997 | Subler et al. | 705/53 |
| 5,654,856 A | 8/1997 | Akiyama et al. | 360/133 |
| 5,677,953 A * | 10/1997 | Dolphin | 705/51 |
| 5,696,714 A | 12/1997 | Russell | 365/106 |
| 5,703,951 A | 12/1997 | Dolphin | 380/25 |
| 5,719,850 A | 2/1998 | Yoshioka et al. | 369/283 |
| 5,719,972 A | 2/1998 | Caron et al. | 385/18 |
| 5,726,971 A | 3/1998 | Wanger et al. | 369/291 |
| 5,732,058 A | 3/1998 | Iwamura et al. | 369/75.2 |
| 5,737,300 A | 4/1998 | Ota et al. | 369/112 |
| 5,748,609 A | 5/1998 | Tanaka | 369/291 |
| 5,757,584 A | 5/1998 | Schick | 360/99.08 |
| 5,757,908 A | 5/1998 | Cooper et al. | 380/4 |
| 5,758,008 A * | 5/1998 | Tozaki et al. | 386/65 |
| 5,764,603 A | 6/1998 | Glaser-Inbari | 369/44.23 |
| 5,765,152 A | 6/1998 | Erickson | 707/9 |
| 5,768,241 A | 6/1998 | Kanazawa et al. | 369/77.2 |
| 5,793,584 A | 8/1998 | Knight et al. | 360/133 |
| 5,793,742 A | 8/1998 | Sandell et al. | 369/291 |
| 5,796,697 A | 8/1998 | Masaki et al. | 369/75.2 |
| 5,799,157 A | 8/1998 | Escallon | 395/227 |
| 5,808,986 A | 9/1998 | Jewell et al. | 369/44.37 |
| 5,809,006 A * | 9/1998 | Davis et al. | 369/275.4 |
| 5,812,519 A | 9/1998 | Kawamura et al. | 369/275.1 |
| 5,815,484 A * | 9/1998 | Smith et al. | 369/275.1 |
| 5,828,482 A | 10/1998 | Jain | 359/211 |
| 5,831,967 A | 11/1998 | Otsuka et al. | 369/291 |
| 5,831,968 A | 11/1998 | Tanaka | 369/291 |
| 5,838,653 A | 11/1998 | Fan et al. | 369/275.1 |
| 5,848,158 A * | 12/1998 | Saito et al. | 705/54 |
| 5,850,384 A | 12/1998 | Ohmori et al. | 369/291 |
| 5,857,021 A | 1/1999 | Kataoka et al. | 380/4 |
| 5,859,829 A | 1/1999 | Otsuka et al. | 369/77.2 |
| 5,859,831 A | 1/1999 | Naito et al. | 369/291 |
| 5,870,364 A | 2/1999 | Raczynski | 369/47 |
| 5,876,823 A | 3/1999 | Nagashima | 428/64.1 |
| 5,881,038 A | 3/1999 | Oshima et al. | 369/59 |
| 5,883,954 A | 3/1999 | Ronning | 500/4 |
| 5,886,979 A | 3/1999 | Moribe et al. | 369/275.3 |
| 5,887,192 A * | 3/1999 | Nishio | 710/7 |
| 5,892,825 A | 4/1999 | Mages et al. | 380/3 |
| 5,897,324 A | 4/1999 | Tan | 434/317 |
| 5,901,339 A | 5/1999 | Saito | 455/2 |
| 5,905,798 A | 5/1999 | Nerlikar et al. | 380/3 |
| 5,912,786 A | 6/1999 | Nicklos et al. | 360/99.09 |
| 5,918,165 A * | 6/1999 | Takatsuka | 455/186.1 |
| 5,919,247 A * | 7/1999 | Van Hoff et al. | 709/217 |
| 5,930,074 A | 7/1999 | Nicklos | 360/99.06 |
| 5,930,215 A | 7/1999 | Fite et al. | 369/58 |
| 5,933,497 A * | 8/1999 | Beetcher et al. | 380/4 |
| 5,940,364 A * | 8/1999 | Ogata et al. | 369/275.4 |
| 5,943,422 A * | 8/1999 | Van Wie et al. | 380/9 |
| 5,946,282 A | 8/1999 | Hirono et al. | 369/112 |
| 5,949,601 A | 9/1999 | Braithwaite et al. | 360/60 |
| 5,959,946 A * | 9/1999 | Tognazzini | 368/84 |
| 5,963,532 A | 10/1999 | Hajjar | 369/112 |
| 5,968,175 A | 10/1999 | Morishita et al. | 713/200 |
| 6,009,525 A | 12/1999 | Horstmann | 713/200 |
| 6,028,620 A * | 2/2000 | Yin | 347/252 |
| 6,032,130 A * | 2/2000 | Alloul et al. | 705/27 |
| 6,043,764 A * | 3/2000 | Sannino et al. | 341/59 |
| 6,119,132 A * | 9/2000 | Kuwano | 707/205 |
| 6,198,875 B1 * | 3/2001 | Edenson et al. | 386/94 |
| 6,278,984 B1 * | 8/2001 | Itami et al. | 705/57 |
| 6,353,890 B1 * | 3/2002 | Newman | 713/193 |
| 6,389,538 B1 * | 5/2002 | Gruse et al. | 713/194 |
| 6,389,541 B1 * | 5/2002 | Patterson | 713/201 |
| 6,397,193 B1 * | 5/2002 | Walker et al. | 705/16 |
| 6,453,420 B1 * | 9/2002 | Collart | 713/201 |
| 6,460,076 B1 * | 10/2002 | Srinivasan | 709/219 |

FOREIGN PATENT DOCUMENTS

| | | |
|---|---|---|
| WO | WO 00/16229 | 3/2000 |
| WO | WO 00/43904 | 7/2000 |

* cited by examiner

CONTENT DISTRIBUTION METHOD AND APPARATUS

Cross reference is made to U.S. patent application Ser. No. 09/315,398 of Braitberg, et al., filed May 20, 1996, 60/140,633, filed Jun. 23, 1999, and application Ser. No. 09/393,150, entitled "WRITEABLE MEDIUM ACCESS CONTROL USING A MEDIUM WRITEABLE AREA" filed on even date herewith, all incorporated herein by reference.

The present invention relates to a method and apparatus for distributing storable content such as audio, video, text or software content and in particular to a method for distributing and enabling encrypted or otherwise protected content.

BACKGROUND INFORMATION

Many traditional approaches to distributing stored content, such as audio, video, text or software content, involve distributing media (such as print media, magnetic or optical media and the like) which, once distributed, can typically be freely used by any person having possession of the media. Such a distribution system, however, imposes certain undesirable restraints on how the content is distributed. For example, in traditional distribution methods, payment (or a contract or commitment to make payment) is obtained at the time the media is distributed. This has a number of consequences. The payment typically must be an all-or-nothing payment, i.e., payment for all content which is on the media, even though as user may wish to have only a portion of such content. Typically, this manner of distribution means that distribution of the physical media and payment for content must be tightly coupled such as by providing for both distribution and payment at a retail location, by a mail transaction (such as a typical book club transaction), by electronic downloading and electronic commerce, and the like. Such distribution methods have substantial associated costs, such as costs of warehousing, retail personnel, and the like. Accordingly, it would be useful to provide a content distribution system which can be configured such that distribution of the media can be independent from payment or payment commitments, and/or independent from enablement of the content.

In some systems involving electronic storage of information on media, the media which is distributed is encrypted or otherwise read-protected and the user must provide a code such as a password in order to have access to the content. This approach, however, although it may assist in certain schemes for avoiding unauthorized copying, has typically had other associated disadvantages. Such approaches typically provide for coupling the enablement of protected content to a particular computer or media reader, e.g., such that it is cumbersome or impossible to use the media in more than one machine (such as imposing a requirement for remembering, and then entering, the password when the media is provided in a second computer or reader), i.e., there is no provision for the media itself to provide, to a computer or reader, information regarding previous content enablement. When protection codes or keys are established and stored by a media fabricator (or the fabricator of a media player or host computer), or otherwise provided prior to distribution of content to a user, the system is typically relatively inflexible, provides the potential for using a copy of the code or key to access multiple media, and presents a potential for interception of enabling keys or codes. Additionally, many schemes are configured such that an exact "binary" copy of user-accessible portions of the disk will result in a copy which can be accessed in the same fashion as the source disk. Accordingly, it would be useful to provide a system in which a binary copy of user-accessible portions is at least partially disabled, e.g. requiring a payment to obtain access.

Some system for producing optical disks allow different disks to have different indicia. Some such systems provide for a step of selectively destroying pre-formatted regions. Such systems have a number of disadvantageous aspects. Systems which selectively destroy pre-formatted regions are inherently destructive and act to destroy, rather than creating recorded data. Such systems operate on pre-formatted regions, thus can not be formed by embossing (which typically occurs simultaneously with formatting). Such systems typically have a relatively coarse resolution, such as being unable to destroy only a single track, without destroying at least one adjacent track). Such systems typically rely on using a specialized device driver to read such a disk, and are typically infeasible for use in modern systems which use a SCSI driver an/or rely on an operating system (such as Windows 98, or the like), for disk read operations. Accordingly, it would be useful to provide a system which can provide disks that have not only information content-mastered data, but also individualizable, preferably unique, identifiers on each disk, using non-destructive track recording.

Many previous distribution systems, especially those relating to electronically or optically stored information, have been designed to prevent or discourage copying of content. Although certain copy protection systems may involve encryption/decryption, it is useful to understand that copy protection is not the same as content encryption and that copy protection is not the same as copyright protection. Implementation of effective copy prevention measures means that the entire cost for making copies falls on authorized distributors. Accordingly, it would be useful to provide a system in which users are permitted or encouraged to make copies, and thus bear the cost of copying, while providing for appropriate payments to content owners and other appropriate entities. It would be useful to provide a system that does not prevent (and preferably encourages) copying, but which does provide copyright protection.

Some systems involve a key, code or decryption algorithm which is stored in a player device or host computer in a manner which can make it feasible to obtain the code, key or algorithm, or to defeat the protection procedure, by analyzing or modifying the player or host computer, thus potentially gaining access to any disk used in such player or host computer. Accordingly, it would be useful to provide a system in which access to a player or host key or code will not suffice, by itself, to obtain access to multiple different disks.

SUMMARY OF THE INVENTION

The present invention includes a recognition of certain problems of previous approaches, including as described herein. In one aspect, the present invention provides for distribution of content by storing content on media in an encrypted or otherwise protected form with the media also having at least a portion which is writeable, e.g., in a user's media reader device, a retail location device, kiosk, vending machine or the like. As used herein, "information content-mastered" refers to a medium in which content is provided on the medium before it reaches the user. A common example is music CD's in which the music is information content-mastered ("ICM") prior to distribution to users. In one aspect, content access information, preferably enabling reading or access to at least portions of the stored content, may be written to or stored on the media, e.g., in exchange for payment. Preferably, the active codes stored on the media are used in conjunction with a media serial number or other media identifier in such a manner that a code which permits access to content on one copy (having a first serial number) will be inoperative to provide access to such content on a second copy (having a second serial number).

According to one aspect, having media identifiers in protected content are distributed in any a number of fashions including blind or targeted mass distribution which may be free distribution if desired, retail location distribution preferably with store-based enablement of at least some content in exchange for payment made at the retail location, via a manned or unmanned kiosk or vending machine, or other distribution methods. Typically, a user who wishes to enable currently-protected content will make a payment, or a commitment for payment, such as in a remote fashion, e.g., over the Internet, and will receive (preferably electronically and preferably in a fashion transparent and substantially unknown to the user) a code, calculated to work in conjunction with the media identifier so as to enable the desired content. Such code, or information related to the code, is stored on the media itself. In this fashion, once the content is enabled, it may be accessed in any of the plurality of readers. Furthermore, separate transactions can be performed, if desired, for accessing separate portions of the stored content (such as selected tracks of a multi-track music media) allowing users to pay for, and access, only the portions of the content desired.

In this way, the distribution of the media can be substantially separated from payment and enablement of content such that it is not necessary to obtain payment, or a commitment for payment, at the time the media is distributed. This makes it feasible to mass distribute and/or blind or target distribute media, e.g., without charge, while still obtaining appropriate payments for content. Because the system permits a particular copy to be played in multiple players yet protects against unpaid-for access to content on copies made from the access-enabled copy, free copying of the media can be permitted and even encouraged, since users of the copies must still make payment in order to obtain access and thus the cost of making copies is shifted from manufacturers to users. Preferably, media identifiers or other media-stored information can be used to discern whether a payment is being received for a user-made copy or a manufacturer-made copy and, if desired, different payment requirements may be imposed (e.g., to avoid charging users for the cost for the manufacturing cost of user-made copies).

Because it is possible to selectively enable some content while protecting other content, media may be distributed with free content which can include, e.g., advertisements, either for protected content thereon or general advertising. Advertising can be presentational or interactive (e.g. prompting for user input and, preferably, providing additional advertising content in response to such prompted-for input). In some embodiments, advertising may be provided on fully or partially blank media (intended to be used by users for copying other media) and price structures for blank and/or for content-bearing media may be established depending on the presence or absence (or the enablement or nonenablement) of advertisements. In some embodiments, non-disabled advertisements are automatically displayed by a media reader.

In one aspect, access code calculation procedures protected by restricting the number of Internet sites or other facilities where access code calculations are performed, such as by providing only one, or only a relatively few number of such sites. Thus, preferably a single access code calculation entity would provide access code calculations for a plurality of different media manufacturers and/or content owners. In one embodiment, the access code calculation site can accumulate a database of information regarding purchasers of content, either directly, from the media or content owners or manufacturers, and/or from electronic means such as "cookie mining" and the like. Such a database is likely to be of relatively high quality since it relates primarily only to paying customers and since it relates to customers of multiple different media manufacturers and/or content owners. Accordingly, one aspect of the present invention involves using, exploiting, selling or renting information from databases obtained at an access code calculation site or entity.

In one aspect, media which stores protected content is distributed to users without the need for payment at the time of media distribution. Payment can be performed at a later time in response to which content may be enabled, and/or users may selectively pay for, and receive enablement of, content such that only portions of content on given media may be accessible at a given time. Following the first enablement of content, access rights may be expanded or otherwise changed, e.g., in response to a second payment.

DETAILED DESCRIPTION OF THE PREFERRED EMBODIMENT

Figure 1:
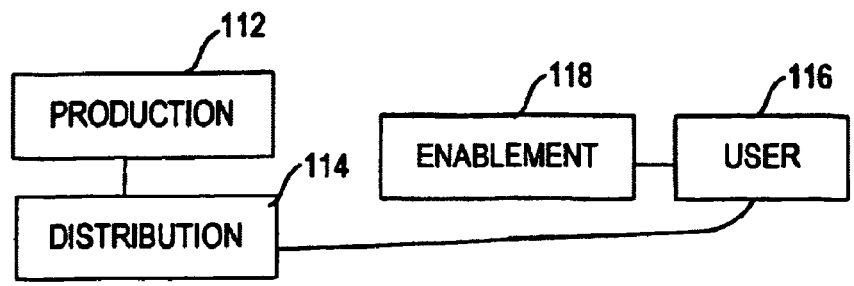
FIG. 1 is a block diagram showing several major components of a system according to the present invention.

As depicted in FIG. 1, in one embodiment media are produced by a production system 112, with the media including serial numbers or other preferably unique (or sufficiently distributed) media identifiers and preferably some media including content, for example, audio, video, or other image, text, software or other storable content, at least some of which is encrypted or otherwise read-protected. The media preferably includes at least a portion which is writeable, such as being serially-writeable. Preferably, the content is provided in a relatively efficient fashion such as by injection molding or other mastering techniques. Methods and apparatus which can be used in connection with fabricating appropriate media, reading such media, and/or protecting content are described, e.g., in U.S. patent application Ser. No. 09/315,398, filed May 20, 1999, U.S. Provisional Application No. 60/140,633, filed Jun. 23, 1999, or U.S.

patent application Ser. No. 09/393,150, filed on even date herewith. One or more distribution systems 114 are used for providing such media to users 116 who can, if desired, enable some or all of the protected content 118, e.g., as described below.

Figure 2:
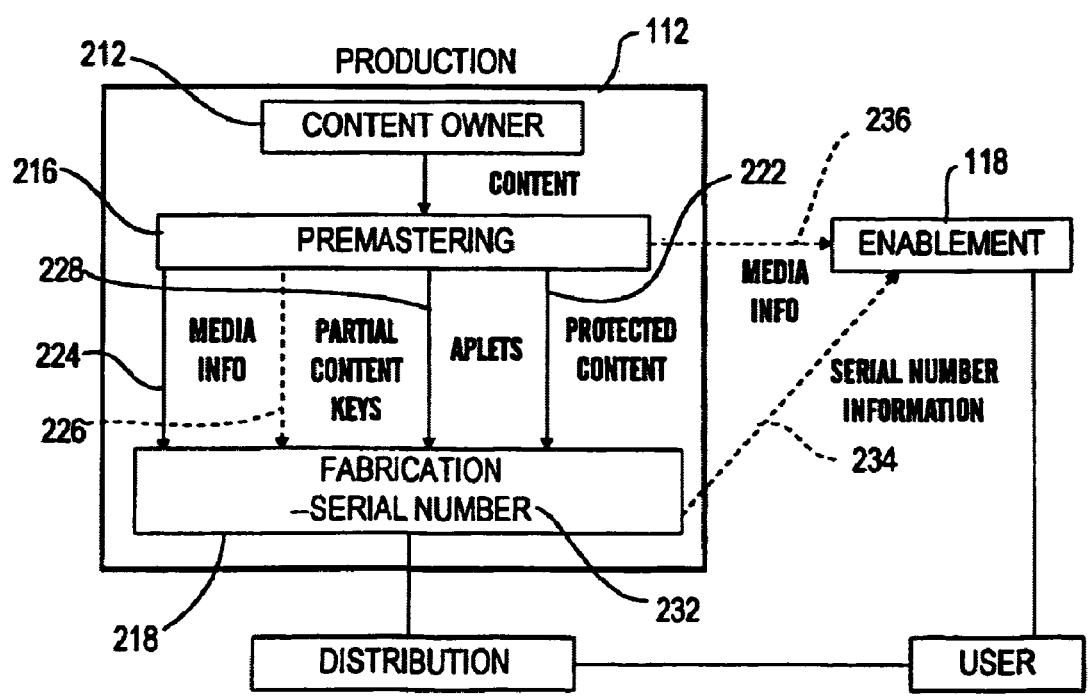
FIG. 2 is a block diagram including details of a production component of a system according to the present invention.

As depicted in FIG. 2, typically a content owner 212, who may be, e.g., an author, composer, publisher, music or motion picture production company and the like, provides content 214 to a premastering facility 216. It is contemplated that typically the content 214 will be provided in unencrypted form, typically in digital form, although at least some features of the present invention can be used when content is provided in encrypted and/or in nondigital, e.g., analog, form. Although premastering 216 is depicted, in FIG. 2, as a separate unit from the content owner and the fabrication, it is possible for some or all units of production 112 to be provided by a single entity. Premastering 216 provides a number of items to an injection molding or other fabrication facility 218. In some embodiments, production of content involves encrypting or otherwise modifying the content. In other embodiments, content may be protected by merely setting or clearing read permission flags for various content which are recognized and enforced by media readers. In other embodiments, content may be protected by selectively encrypting or modifying file information such as a file allocation table (FAT) and the like. In the depicted embodiment, the protected content 222 is passed to the fabrication facility 218. Preferably, media information is also provided 224 which may include information such as type of media (video versus text versus audio and the like) format (both data encoding format and sector and similar information, i.e., media formatting information) and/or user-intended information (titles, authors, composers, artists, lengths or sizes of content and the like). In some embodiments, partial content-enablement keys or codes may be provided 226. For example, in some embodiments, it is desired to provide access permissions which are based on three or more items, such as a combination of a media serial number, a partial access code 226 and/or a stored access code (e.g., in exchange for payment as described below). In some embodiments, it may be desired to positively control access to all content, such that all content is associated either with a code preventing access or with a code denying access. In these configurations, when there is some content which should be initially available to a user (such as instructions on how to use disk, instructions on how to make payments and/or obtain access, advertisements or the like) appropriate codes permitting access to such information may be included 226. In other embodiments, default systems may be used, e.g., such that access to particular contents is denied unless access permission codes are stored on the disk or systems in which access to contents is always permitted unless a code denying access is stored on the disk.

Software useful in connection with obtaining or storing access codes and/or otherwise using the disk, are preferably stored on the disk 228. These can include, e.g., small applications (applets) which recognize and/or display certain types of information, such as instructions, advertising and the like, applications which assist in, or which automatically connect a user to an Internet site or other payment or access code calculation site, and the like.

The fabrication facility 218 generates the media containing the various items 222, 224, 226, 228 received from premastering 216, as well as providing a serial number or other media identifier 232. The media identifier may include information regarding or identifying the content owner or manufacturer, date of production and similar information.

The media identifier in some embodiments is preferably unique to each optical disk or other media. It is possible, however, to provide configurations in which the media identifier is not necessarily strictly unique, in which the probability for duplication is sufficiently low that there is relatively little likelihood of substantial loss of income from unauthorized use or copying arising from such duplications.

In some embodiments, it is useful for enablement system 118 to have access to information related to serial numbers 232, media information 224 and the like. For example, it may be useful for an enablement facility 118 to receive information 234 specifying a range of serial numbers which was used for blank media and another range of serial numbers which was used for content-bearing media. It may be useful for an enablement facility 118 to receive information 236 specifying that a certain disk title is associated with, for example, 17 separately-enablable media tracks, and or indicating that such media tracks are associated with particular ranges of serial numbers.

Figure 3:
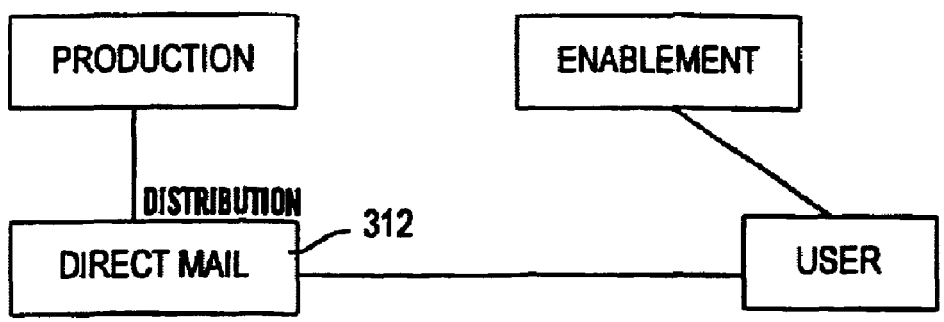
FIG. 3 is a block diagram depicting a direct mail distribution system.

Distribution of the fabricated media can be performed in a number of fashions. As depicted in FIG. 3, distribution can be unsolicited, e.g. by direct mail, including in a blind or targeted fashion, and can be free distribution or distribution at reduced cost 312.

Figure 4:
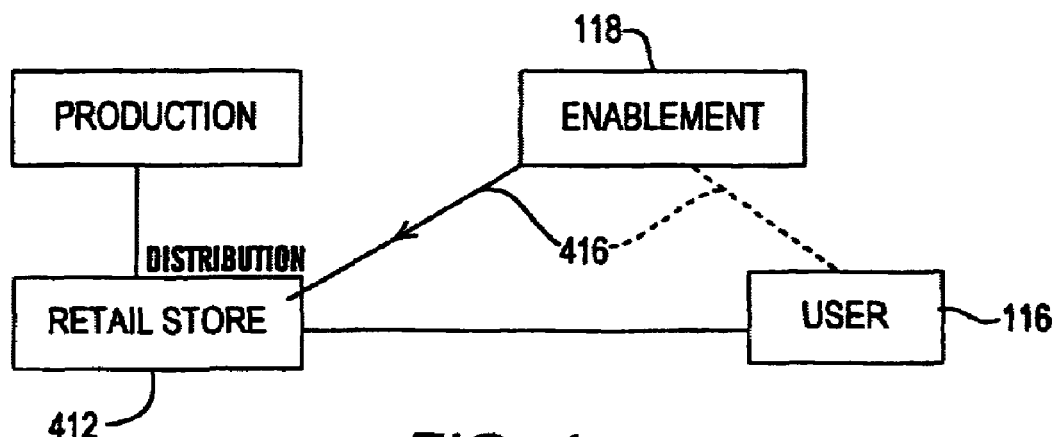
FIG. 4 is a block diagram depicting a retail store distribution system.

In the embodiment of FIG. 4, distribution occurs when a user 116 visits a retail store 412. In this embodiment, the media stock maintained by the retail store is at least partially disabled (such as being encrypted). In this way, users cannot access content on the media until the retail store has enabled such content, e.g., by receiving access codes 416 from an enablement facility 118. This not only discourages shoplifting but also provides users 116 with flexibility such that the user may request that only portions of the content on the media (e.g., certain initially desired music tracks on a music medium) will be enabled at the retail location 412. In one embodiment of the invention, if the user pays for only partial enablement, the user may later arrange 416 with an enablement facility 118 (e.g., as described below in connection with FIGS. 6A through 6F) for enabling additional content. If desired, some or all steps involved in the enablement can be performed in a self-service fashion, such as by a user interacting with a kiosk or vending machine which can receive payment (e.g. using a coins or cash handler) or payment authorization (e.g. for authorizing a charge account or debit account, e.g. using a credit card reader). In this sense a retail location can be a kiosk or vending machine.

Figure 5:
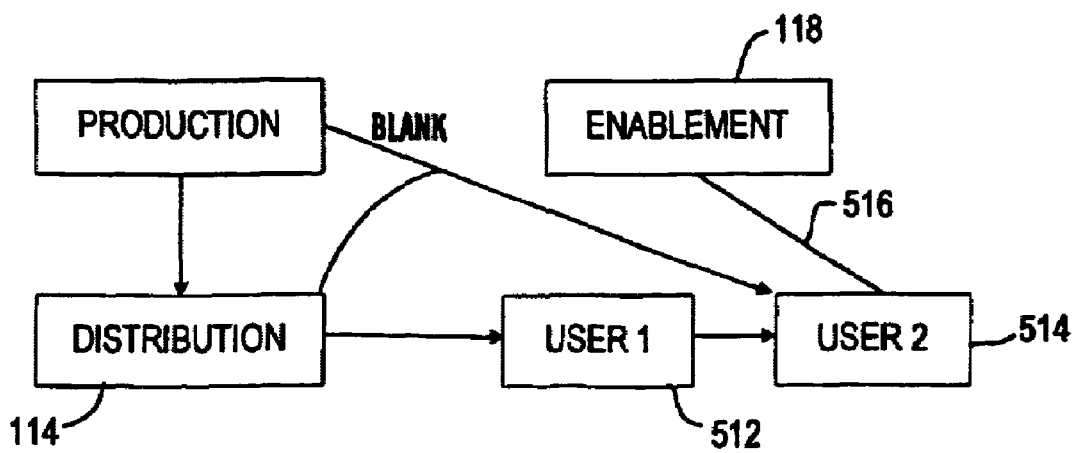
FIG. 5 is a block diagram depicting a user-copying distribution system according to an embodiment of the present invention.

In the embodiment depicted in FIG. 5, after a first user 512 receives media (by any of the various distribution channels 114), the user 512 may make one or more copies, e.g., by copying onto a blank disk, which may be distributed to another user 514. The blank disk contains at least some writeable portion. In this way, some of the costs of copying, such as the cost of the blank disk, the time and facilities for making copies and the like, are borne by the user 512. In at least some configurations, the copy distributed to the second user 514 has at least some content which is not enabled, e.g., because the serial number stored on the second copy 232 will differ from the serial number on the source disk. Accordingly, the second user 514, in order to access the content, uses an enablement facility 118 to obtain appropriate access codes, preferably in exchange for payment, 516, e.g., as described more thoroughly below.

Figure 6A:
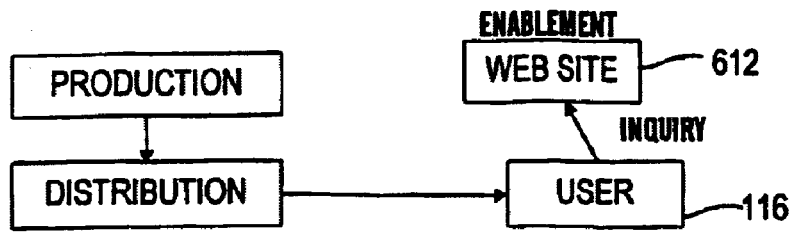
FIGS. 6A–6F are block diagrams depicting sequential stages in media enablement according to one embodiment of the present invention.
Figure 6B:
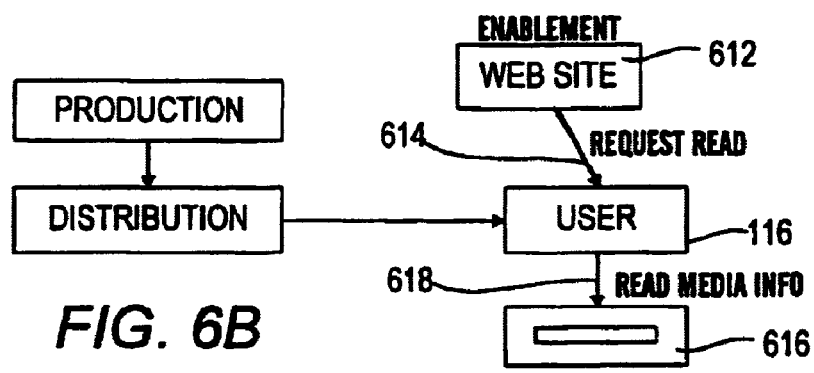
Figure 6C:
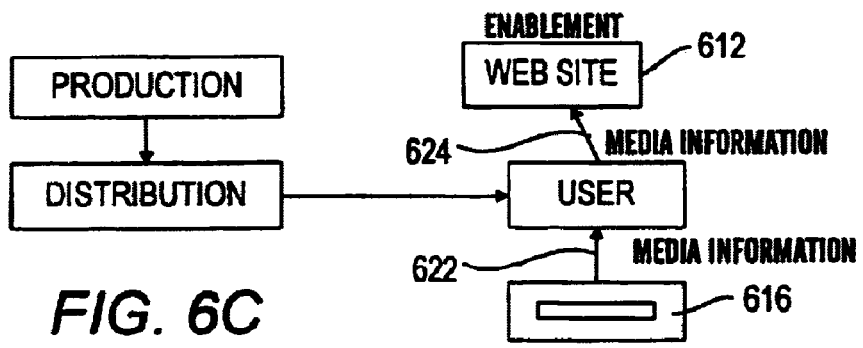
Figure 6D:
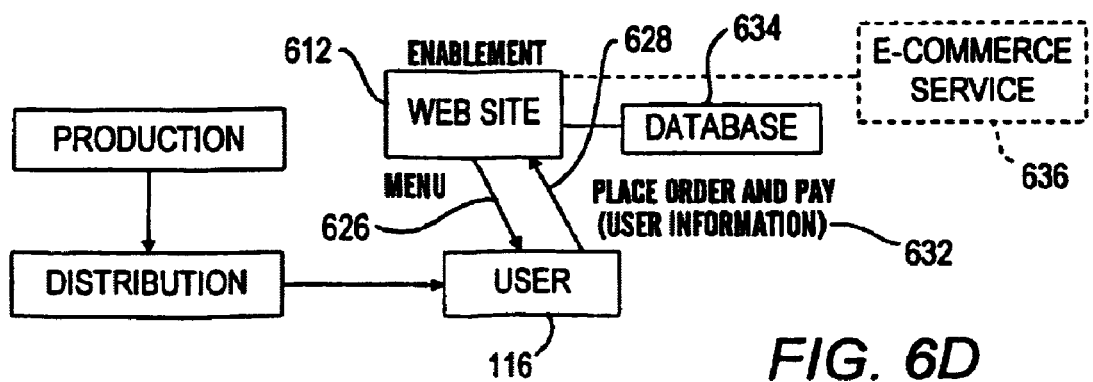

As depicted in FIG. 6A, in one embodiment, in order to achieve enablement of some or all protected content, a user initially sends an inquiry to an enablement facility which, in the depicted embodiment is a Internet web site 612. The web site 612 sends a message to the user's computer or other Internet appliance which includes a read request 614 for reading information from the media. In response, the user's computer or Internet appliance sends appropriate signals to a media reader such as an optical disk reader as described in Ser. No. 09/315,398, supra, 616 for reading appropriate media information 618 (FIG. 6B). The media reader 616 reads media information and transfers this information 622 to the user's personal computer (PC) or Internet appliance whence it is transferred 624 to the web site 612 (FIG. 6C). Preferably, the transferred media information 624 includes information relating to identification of protected content sufficient for the web site 612 to formulate menu information 626 (FIG. 6D) for presentation to the user 116. For example, the media information 624 may include titles or other descriptors of content which is stored on the disk and information about access options that may be obtained by the user. When access options relate to content which is not currently accessible to the user, the access option may include one or more options for paying to obtain various types of access. When access options relate to content which is currently accessible to the user, access options may include options for obtaining various types of enhanced access such as access for additional or longer periods of time, different types of access (such as write access in addition to read access, access to additional components such as illustrations, animation, music, additional languages, subtitles and the like).

Although the embodiment depicted in FIGS. 6A through 6D provides for displaying a menu of access options to the user which is generated at a remote location such as a web site 612, it is also possible to provide configurations in which all the information and software needed for displaying access option menus to the user are provided locally, such as on the media itself and/or the reader 616.

If the user 116, viewing a menu or similar information, decides to request additional access to the media, the user makes selections or otherwise provides inputs to the user's PC or Internet appliance which results in one or more messages 628 being sent to the web site 612 requesting the placing of an order for additional access and authorization for making payments (such as charging to a credit card or other account). In some embodiments the web site 612 may be configured to request or elicit user information 623, e.g., for storing in a database 634 such as information identifying the user, user address, phone, fax or e-mail number, and the like. In some embodiments, user information 632 may be obtained substantially automatically such as by uploading information from the user's computer or other Internet appliance. Although it is possible to configure the web site 612 such that it implements the necessary electronic commerce (provides the proper charge to the user's credit card account or the like). It is contemplated, that, in many situations, web site 612 will couple to the services of an electronic commerce (e-commerce) service 636, e.g., in a manner that will be understood by those of skill in the art after understanding the present disclosure.

Figure 6E:
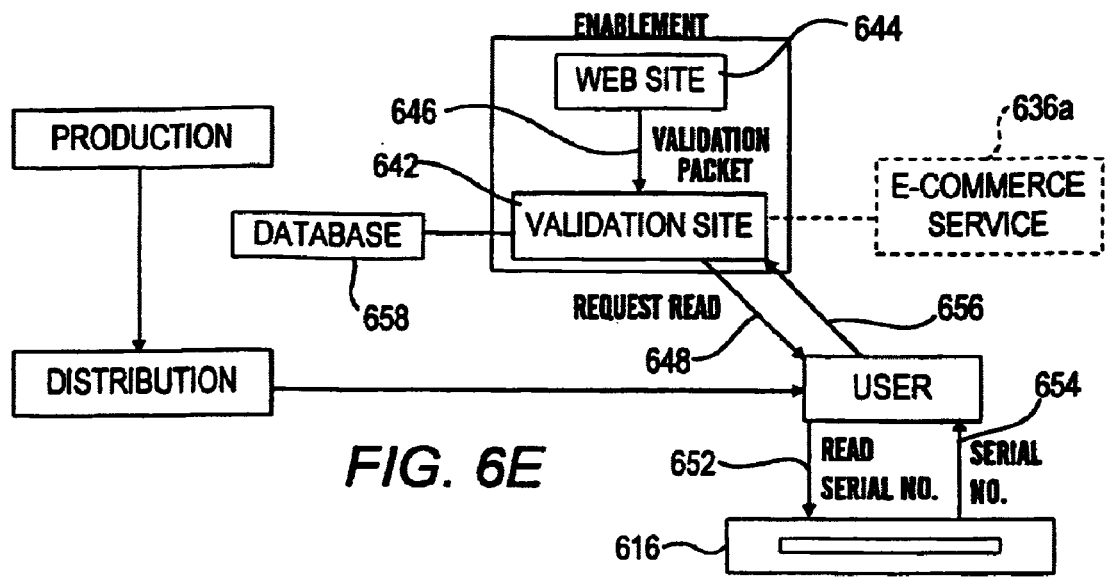
Figure 6F:
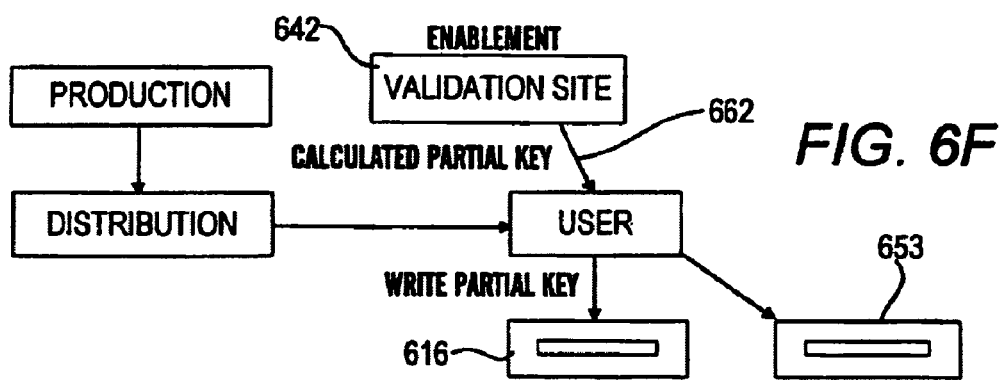

In order to provide the additional access which the user has ordered, certain information is preferably provided to, and recorded on, the media as described below. Although it is possible to implement embodiments of the present invention by having the web site 612 perform necessary access code calculations, it is generally preferred to have a relatively limited number, such as one or few, entities with the capability of performing the necessary calculation. This is because the algorithms used for performing such calculations are preferably kept secret and unavailable to the general public (in order to prevent users from obtaining unauthorized or unpaid-for access to content). However, it is contemplated that there may potentially be a relatively large number of different web sites 612 to which a user might be able to connect for selecting access options and/or making payments. Accordingly, it is generally preferred to provide a separate validation site 642 to which multiple web sites 634 may couple. Although it is possible to configure the system such that the user continues to communicate directly with the web site 644 which acts to pass messages to and from the validation sites 642, it is preferred to perform a redirection wherein the web site 644 passes a validation packet 646 to the validation site 642 and, thereafter, the user sends messages to and receives messages from, the validation site 642 directly (FIG. 6E). Preferably this is done in a substantially transparent fashion such that the user may not even be aware that a redirection has taken place and, in any case, can proceed with the transaction without knowing or being aware of the resource locator or other address of the validation site 642 (e.g., as a security precaution). Although in the configuration depicted in FIG. 6D, the payment was performed by a coupling of the web site 612 to the e-commerce service 636, it is also possible to provide configurations in which payment processing is performed by or through the validation site, e.g., by a coupling of the validation site to an e-commerce service 636a.

Preferably, the access code which enables access to content is a code which operates in conjunction with the media serial number. For example, the media reader 616 may be configured such that access to given content is permitted only if a recognized access code results from a hashing or other combination or procedure performed on both the serial number of the media (read directly from the media) and a code stored on the media. Accordingly, the appropriate code, in order to achieve given access, will be different for every different serial number and thus for every different disk or other media. In order for the validation site 642 to calculate the proper code for a given medium, the validation site obtains the disk serial number or other media identifier, e.g., by sending a request 648, in response to which, the user's PC or Internet appliance sends commands for reading the serial number 642 to the reader 616 which then responds with the serial number or other media identifier 654 which is then transferred 656 to the validation site. Preferably, the serial number is encrypted, e.g. using an encryption process preferably stored or embedded in the player 616, before the serial number is transmitted. If desired, the system can also be configured such that other information is returned such as user information, e.g., for storing in a database 658. The validation site 642 calculates a calculated partial key which, when properly combined with the media serial number, will result in an access code recognized by the player 616 as permitting the desired access. The calculated partial key is then transmitted 662 (FIG. 6F), preferably in an encrypted form which can be decrypted by a decryption process stored or embedded in the player 616, to the user's computer or Internet appliance which controls the reader 616 for storing the calculated partial key (or information based thereon) onto the writeable portion of the media. The user can thereafter access the desired content, including using a second, different player 653 if desired, without the need to record or enter additional codes. In one embodiment, the media player tests the recorded code to determine if it will result in a proper access code. In this way, if there has been a data transmission or other error, the player can request that the validation site recalculate or retransmit codes.

Figure 7:
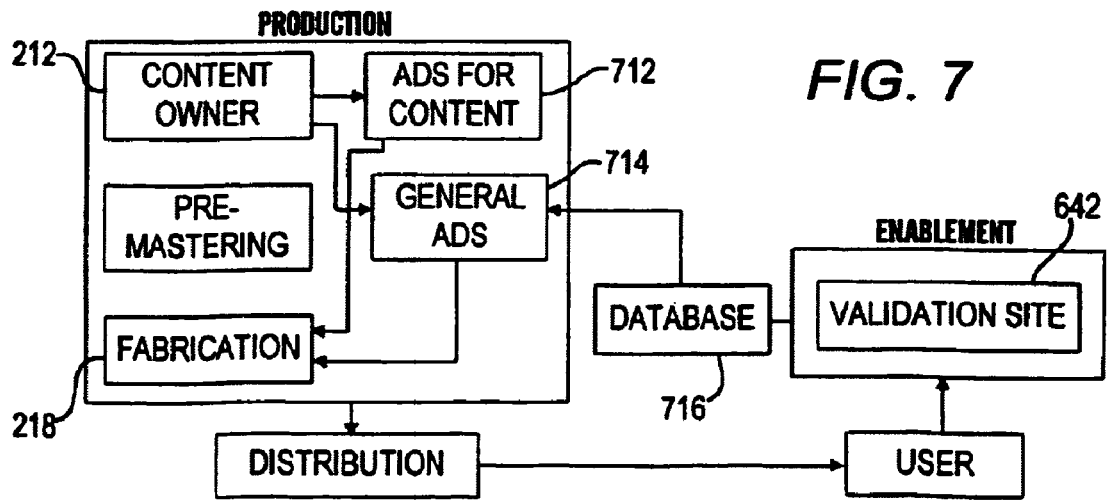
FIG. 7 is a block diagram depicting advertising-content embodiment of the present invention.

As depicted in FIG. 7, in some embodiments, when the disk or other media is fabricated 218 it includes one or more advertisements which may be advertisements for protected content 712, e.g., provided from the content owner 212 publisher and the like, and/or one or more general advertisements 714. It is anticipated that general advertisements 714 will be most effectively selected or configured in conjunction with a demographic or customer base database 716 such as the database compiled by the validation site 642. As noted above, it is preferred that the validation site 642 be coupled to a plurality of web sites 644 and preferably not limited to a single media publisher or fabricator. Accordingly, a database 658 from a validation site 642 is expected to be of relatively high quality since it contains information on media access customers for a variety of different publishers and/or content providers.

Figure 8:
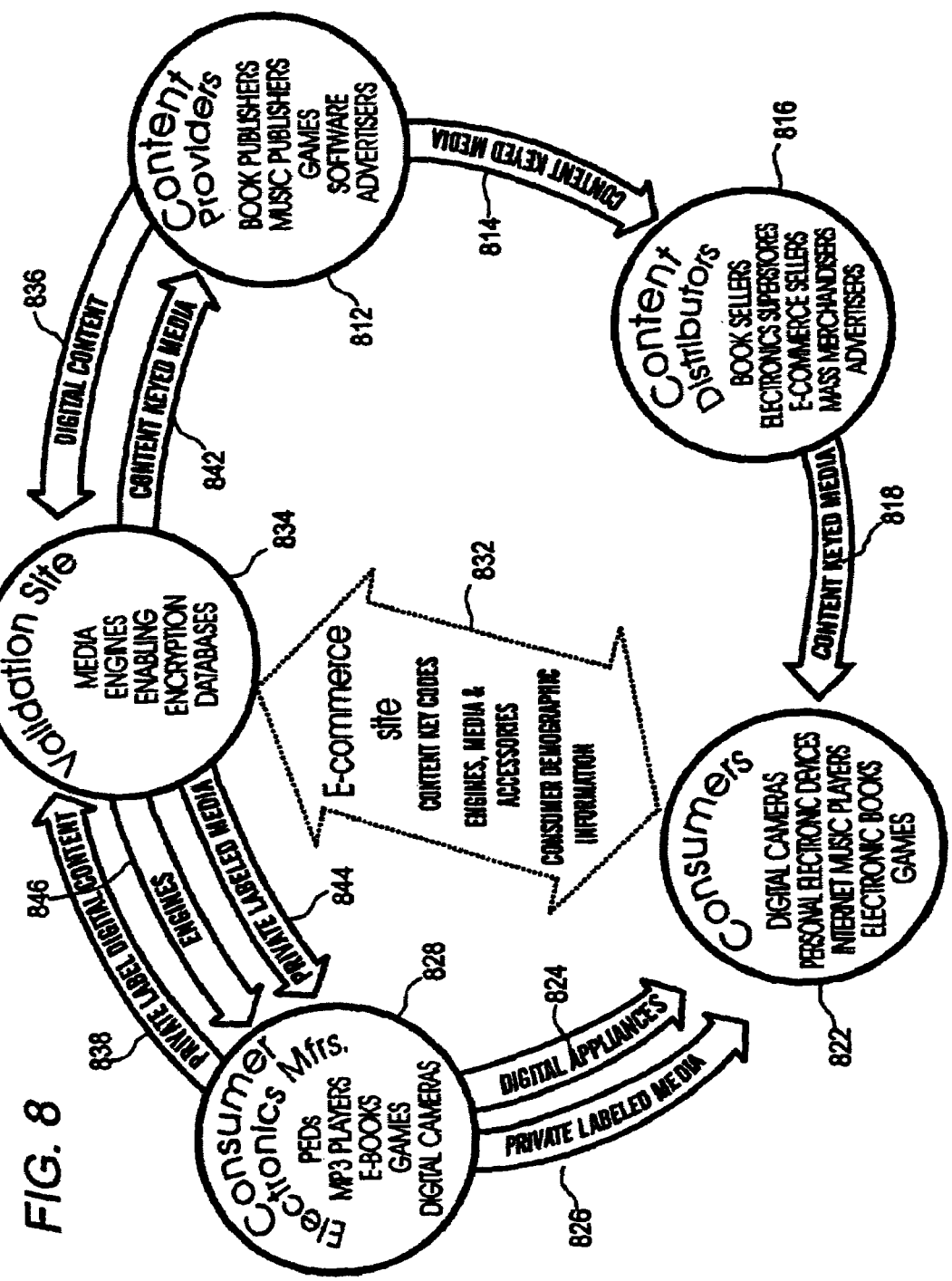
FIG. 8 is a block diagram depicting flow of information and codes among various entities according to an embodiment of the present invention.

In the configuration depicted in FIG. 8, the content provider 812 may include, for example, book publishers, music publishers, game or software providers or publishers and advertisers. In one embodiment, publishers will provide content in digital format for mastering (molding) onto media. In addition to protected, e.g. copyrighted, content, publishers may add free promotional, attract or other materials. Packed media can be distributed through the publisher's existing traditional distribution channels. For example, protected-content media may be provided 814 to content distributors 816 which can include, for example, book sellers, electronic stores, mass merchandisers, advertisers, electronic commerce sellers and the like. The media are distributed 818, through various channels, to consumers 822 in the form of, or useable in connection with, personal electronic devices (PED) such as digital cameras, Internet music players, electronic books, games and the like. Consumers may also obtain digital appliances 824 and/or private labeled media 826, e.g., from consumer electronic manufacturers such as makers of personal electronic devices, MP3 players or other music players, electronic books, games or digital cameras, e-book readers, and other electronic devices including a variety of personal electronic devices (PED's) and/or Internet appliances 828. Media can be distributed through traditional retail channels such as camera stores, computer stores, bookstores, grocery stores, catalog or Internet mail-order, etc. Via an Internet connection, such as via a web site, an e-commerce site and the like 832, consumers can communicate and/or receive keys or codes (e.g. for accessing protected information), engines or other software, media and accessories, and/or consumer demographic information, to or from a validation site 834. The validation site may receive digital content 836, 838 from content providers or manufacturers 812, 828 and/or can provide protected media 842, 844 and/or engines or other applications or software 846. The validation site 834 can generate such media or engines, as well as perform enabling of access (e.g. via keys, codes and the like), content mastering and/or encryption, and accumulation or storage of consumer demographic databases.

In light of the above description, a number of advantages of the present invention can be seen. The present invention can assist in distributing content to potential users or consumers, e.g., by providing a system in which distribution of content-bearing media is separate from enablement and/or payment systems. The present invention makes it easier to implement a system in which users can readily receive stored content and can obtain access to only that content which is desired, including, in some configurations, only portions of content on given media. The present invention can facilitate systems in which protected content can be readily copied and in which copied content is accessible only after payment of appropriate fees. The present invention can assist in providing a wide variety of different types of access, as selected or needed by different users.

A number of variations and modifications of the invention can be used. It is possible to use some features of the invention without using others. For example, it is possible to use mass or blind distribution of content with later enablement in return for payment, without implementing collection of user information for accumulating databases. It is possible to provide processes which perform steps in different order than those depicted or described or which have more or fewer steps.

Although the present invention has been described in connection with media as described in Ser. No. 09/315,398, supra, the present invention can also be used in other media which include writeable portions such as CD-R, CD-RW, DVD-R media and the like. Although embodiments were described which use Internet communications links, other communication links can be used including local and network (LAN), wide area network (WAN), telephone, cable, fiber optic, radio, infrared or other wireless links and the like.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for distribution of content, comprising:
   distributing encrypted content-mastered optical disks to a plurality of users, wherein each optical disk includes the encrypted mastered content, a writeable area, and a unique identifier and wherein a first portion of the encrypted mastered content on each optical disk is readable by an optical disk reader in response to the following steps:
   distributing a first permission code to the optical disk reader in exchange for a first payment;
   generating a first access code by using the first permission code and the unique identifier;

writing the first access code onto the writeable area using the optical disk reader; and decrypting the first portion of the encrypted mastered content stored on the optical disk by using the first access code.

2. The method of claim 1, wherein distributing the first permission code comprises distributing the first permission code via an Internet communications link.

3. The method of claim 1, wherein the encrypted mastered content includes content selected from among text content, music content, software and motion picture content.

4. The method of claim 1, wherein a second portion of the encrypted mastered content on each optical disk is readable by an optical disk reader in response to the following steps:

distributing a second permission code to the optical disk reader in exchange for a second payment, generating a second access code by using the second permission code and the unique identifier; and writing the second access code onto the optical disk, whereby the optical disk reader may decrypt the second portion of the encrypted mastered content stored on the optical disk by using the second access code.

5. The method of claim 1, wherein said step of distributing encrypted content-mastered optical disks comprises unsolicited distributing of the encrypted content-mastered optical disks.

6. The method of claim 1, wherein said first payment is a payment performed by authorizing a charge to a credit or debit account over a communications link.

7. The method of claim 1, wherein the first access code is generated by a computer which is remotely connected to the optical disk reader over a communications link.

8. The method of claim 7, wherein said communications link is an Internet link.

* * * * *